United States Patent
Kitaura

(10) Patent No.: US 10,316,870 B2
(45) Date of Patent: Jun. 11, 2019

(54) HYDRAULIC CYLINDER AND CLAMP DEVICE

(71) Applicant: PASCAL ENGINEERING CORPORATION, Itami-shi, Hyogo (JP)

(72) Inventor: Ichiro Kitaura, Itami (JP)

(73) Assignee: Pascal Engineering Corporation, Hyogo (JP)

(*) Notice: Subject to any disclaimer, the term of this patent is extended or adjusted under 35 U.S.C. 154(b) by 360 days.

(21) Appl. No.: 15/315,600

(22) PCT Filed: Apr. 10, 2015

(86) PCT No.: PCT/JP2015/061226
§ 371 (c)(1),
(2) Date: Dec. 1, 2016

(87) PCT Pub. No.: WO2015/186432
PCT Pub. Date: Dec. 10, 2015

(65) Prior Publication Data
US 2017/0198729 A1    Jul. 13, 2017

(30) Foreign Application Priority Data
Jun. 4, 2014   (JP) .................. 2014-115724

(51) Int. Cl.
*B23Q 3/08*   (2006.01)
*B25B 5/06*   (2006.01)
(Continued)

(52) U.S. Cl.
CPC .......... *F15B 15/2807* (2013.01); *B23Q 3/082* (2013.01); *B23Q 3/108* (2013.01);
(Continued)

(58) Field of Classification Search
CPC . B23Q 3/08; B23Q 3/082; F15B 15/28; F15B 15/2807; F15B 15/14; B25B 5/061
See application file for complete search history.

(56) References Cited

U.S. PATENT DOCUMENTS 3,340,371 A * 9/1967 Trimmer ............. F15B 15/2807
                                        200/82 R
4,697,800 A * 10/1987 Stahl ..................... B25B 5/061
                                        269/20

(Continued)

FOREIGN PATENT DOCUMENTS

JP   47-014028 Y1   5/1972
JP   5584301 U      6/1980
(Continued)

*Primary Examiner* — Tyrone V Hall, Jr.
(74) *Attorney, Agent, or Firm* — Norris McLaughlin, P.A.

(57) ABSTRACT

A hydraulic cylinder includes a rod insertion hole formed in a piston member, an auxiliary rod provided to a head side end wall member and capable of being inserted into the rod insertion hole, a rod fitting hole formed to pass through the head side end wall member and the auxiliary rod, a movable rod installed in the rod fitting hole and whose end portion toward a head side end wall projects to the exterior, a movement restriction mechanism that prohibits shifting of the movable rod in an unclamping state and permits shifting of the movable rod in a clamping state.

10 Claims, 11 Drawing Sheets

(51) Int. Cl.
  *F15B 15/14* (2006.01)
  *F15B 15/28* (2006.01)
  *B23Q 3/10* (2006.01)
(52) U.S. Cl.
  CPC .............. *B25B 5/061* (2013.01); *F15B 15/14* (2013.01); *F15B 15/28* (2013.01)

(56) References Cited

U.S. PATENT DOCUMENTS

| | | | |
|---|---|---|---|
| 5,118,088 A * | 6/1992 | Sawdon | B25B 5/122 269/27 |
| 5,171,001 A * | 12/1992 | Sawdon | B25B 5/163 269/27 |
| 5,190,272 A * | 3/1993 | Zika | B23B 31/1071 269/309 |
| 6,095,509 A * | 8/2000 | Yonezawa | B23B 31/202 269/309 |
| 6,101,888 A * | 8/2000 | Yonezawa | B25B 5/06 269/138 |
| 2004/0046302 A1 * | 3/2004 | Bernhard | B23B 31/107 269/309 |
| 2007/0063406 A1 * | 3/2007 | Soroka | B23Q 1/0072 269/309 |
| 2015/0285280 A1 | 10/2015 | Kawakami | |

FOREIGN PATENT DOCUMENTS

| | | |
|---|---|---|
| JP | 11-030201 | 2/1999 |
| JP | 2001-087991 A | 4/2001 |
| WO | 2014/077030 A1 | 5/2014 |

\* cited by examiner

HYDRAULIC CYLINDER AND CLAMP DEVICE

BACKGROUND OF THE INVENTION

The present invention relates to a hydraulic cylinder and to a clamp device, and in particular relates to a technique for providing a detection mechanism with which the position of a piston member that is a object of detection can be freely set, with the detection mechanism having a compact structure.

In the prior art, a hydraulic cylinder that is employed in a clamp device that clamps an object for clamping such as a workpiece or the like which is to be supplied to machining has comprised a cylinder main body, a piston member that is provided in the cylinder main body so as to move freely forward and backward therein, a hydraulic pressure operation chamber for driving the piston member in at least one of its advance direction and its retraction direction. In such a hydraulic cylinder, various rod position detection techniques have been implemented for detecting a forward limit position of the piston member of the hydraulic cylinder in its axial direction, and a backward limit position thereof, an intermediate limit position and so on.

For example, in the hydraulic cylinder of JP Laid-Open Utility Model Publication Showa 55-84301, a reciprocating type piston is received in a cylinder bore within a cylinder main body, auxiliary chambers and detection pistons are provided in the end walls at each end of the cylinder main body, and, when the piston arrives at an end of its stroke, along with the corresponding detection piston being pushed toward the exterior by the piston and the piston being slowly stopped via the detection piston and via a fluid passage that is formed therein, also the fact that the piston has arrived at the end of its stroke is detected by an external limit switch for detecting the end of the stroke.

And, in the clamp device of JP Laid-Open Patent Publication 2001-87991 that includes a hydraulic cylinder, the position of the piston rod (i.e. the end of its stroke) is detected by a pressure sensor that detects the hydraulic pressure supplied to the hydraulic cylinder, and by a two-position sensor that detects an upper position and a lower position of a portion to be detected at the lower end portion of an operating rod that projects to the exterior from the piston member of the hydraulic cylinder.

SUMMARY OF THE INVENTION

With the device of JP Laid-Open Utility Model Publication Showa 55-84301, there are the problems that, due to the provision of the auxiliary chambers and the detection pistons in the walls at both ends of the cylinder main body, and due to the provision of the limit switches that detect the detection rods outside the walls at both ends, the length of the hydraulic cylinder is increased, the wiring and the like of the two limit switches becomes longer and more complicated, and so on.

And, with the clamp device including a hydraulic cylinder of JP Laid-Open Patent Publication 2001-87991, since the operating rod projects to the exterior from the piston member of the hydraulic cylinder, and an upper position and a lower position of the portion to be detected that is provided at the lower end of the operation rod are detected with the two position sensor, accordingly there is the problem that the clamp device is increased in size, because it becomes necessary to provide a detection space below the hydraulic cylinder for shifting of the portion to be detected, and for installing the position sensor.

Objects of the present invention are, in a hydraulic cylinder and in a clamp device: to make it possible freely to set the position of the piston member that is to be the object of detection; to make it possible to change the position of the piston member that is to be the object of detection; to dispose within the hydraulic cylinder the major portion of a mechanism for detecting the position of the piston member; and so on.

Present invention presents a hydraulic cylinder comprising a cylinder main body in which a cylinder bore is formed, a piston member including a piston portion that is installed in the cylinder bore so as to be movable therein in its axial direction and an output rod, and at least a single hydraulic pressure operation chamber that is defined within the cylinder bore between the piston portion and a head side end wall of the cylinder main body, characterized by comprising: a rod insertion hole formed in the piston portion and the output rod so as to communicate with the hydraulic pressure operation chamber; an auxiliary rod that is provided to the head side end wall so as to project into the cylinder bore, and that can be inserted into the rod insertion hole; a rod fitting hole that is formed so as to penetrate through the head side end wall and the auxiliary rod in an axial direction; a movable rod that is fitted in the rod fitting hole, and of which an end portion toward the head side end wall projects to the exterior from the rod fitting hole; a movement restriction mechanism that, along with prohibiting shifting of the movable rod in the axial direction in a state in which a lower end of the piston portion is positioned in a first region within the cylinder bore and permitting shifting of the movable rod in the axial direction in a state in which the lower end of the piston portion is positioned in a second region within the cylinder bore, also, due to hydraulic pressure in the rod insertion hole, shifts the movable rod by a predetermined distance in the direction in which an amount of projection to the exterior from the rod fitting hole increases; and a detection switch that detects whether the movable rod has shifted or not, and that outputs a detection signal.

In first preferable aspect of present invention, the movement restriction mechanism may comprise: a large diameter portion formed at a tip end portion of the movable rod and having a larger diameter than other portion thereof a seal member that is installed on an external circumferential portion of the large diameter portion; a large diameter hole portion that is formed in a portion of the rod fitting hole and in which the large diameter portion is movable in the axial direction; an annular concave portion that is formed on the large diameter portion of the movable rod; a plurality of ball holding openings that are formed in a cylindrical circumferential wall of the large diameter hole portion of the auxiliary rod; a plurality of balls that are held in the plurality of ball holding openings so as each to be movable in a radial direction, and that can partially engage with the annular concave portion; and a small diameter hole formed in the rod insertion hole that causes the plurality of balls partially to engage in the annular concave portion when the lower end of the piston portion is in the first region, and a large diameter hole, also formed in the rod insertion hole, that makes it possible for the plurality of balls to escape from the annular concave portion when the lower end of the piston portion is in the second region.

In second preferable aspect of present invention, an fitting hole forming wall portion of the head side end wall that forms a portion of the rod fitting hole and the auxiliary rod may be constituted by a unitary auxiliary rod member, and the auxiliary rod member is detachably fixed to the cylinder main body in order to be possible to exchange of the auxiliary rod member for an auxiliary rod member having a different length.

In third preferable aspect of present invention, the hydraulic cylinder may comprise: a male screw portion formed on an external circumferential portion of the auxiliary rod member; a threaded hole formed in the head side end wall, and into which the auxiliary rod member is screwed; a lock nut that is screwed over and engaged with the auxiliary rod member at an exterior side of the head side end wall; and a seal washer that is fitted over the auxiliary rod member between the head side end wall and the lock nut.

In fourth preferable aspect of present invention, the hydraulic cylinder may comprise: a small diameter hole forming member that forms the small diameter hole of the piston member; a sliding hole that is formed in the piston member and in which the small diameter hole forming member is installed so as to slide freely in the axial direction, and that has a same diameter as the large diameter hole; a threaded hole that is formed in the output rod more to the end thereof than the sliding hole; a screw shaft, formed integrally with the small diameter hole forming member, and screwed into and engaged with the threaded hole; and a tool engagement hole formed at a tip end portion of the screw shaft.

In fifth preferable aspect of present invention, the hydraulic cylinder may comprise: a spring installation hole formed in the auxiliary rod so as to communicate with the large diameter hole portion; and a compression spring that is installed in a portion of the large diameter hole portion and in a spring installation hole, and that biases the movable rod toward an interior of the rod insertion hole.

In sixth preferable aspect of present invention, when the lower end of the piston portion is in the second region, the piston portion may contact against or approaches a rod side end wall.

In seventh preferable aspect of present invention, when the lower end of the piston portion is in the second region, the piston portion may be positioned at an intermediate portion of the cylinder bore in its length direction.

Present second invention presents a hydraulic pressure driven type clamp device wherein a hydraulic cylinder according to present invention is installed thereto.

Present third invention presents a hydraulic pressure driven type clamp device comprising; a cylinder main body in which a cylinder bore is formed, a piston member including a piston portion that is installed in the cylinder bore so as to be movable therein in its axial direction and an output rod, and at least a single hydraulic pressure operation chamber that is defined within the cylinder bore between the piston portion and a head side end wall of the cylinder main body, characterized by comprising: a rod insertion hole formed in portions of the piston portion and the output rod so as to communicate with the hydraulic pressure operation chamber; an auxiliary rod that is provided to the head side end wall so as to project into the cylinder bore, and that can be inserted into the rod insertion hole; a rod fitting hole that is formed so as to penetrate through the head side end wall and the auxiliary rod in an axial direction; a movable rod that is fitted in the rod fitting hole, and of which an end portion toward the head side end wall projects to the exterior from the rod fitting hole; a movement restriction mechanism that, along with prohibiting shifting of the movable rod in the axial direction in a state in which the piston member is in an unclamp position and permitting shifting of the movable rod in the axial direction in a state in which the piston portion is in a clamp position, also, due to hydraulic pressure in the rod insertion hole, shifts the movable rod through a predetermined distance in the direction in which an amount of projection to the exterior from the rod fitting hole increases; and a detection switch that detects whether the movable rod has shifted or not, and that outputs a detection signal.

Since present invention has the structure described above, it provides the following advantageous effects.

Since it is possible for the rod insertion hole, the auxiliary rod, the rod fitting hole, the movable rod, and the major portion of the movement restriction mechanism to be provided within the hydraulic cylinder, accordingly it is possible to prevent increase in the size of the hydraulic cylinder due to the various members and mechanisms for detection. Moreover, since it is possible to set the first and second regions freely via the movement restriction mechanism, accordingly it is possible freely to set the position of the piston member which is to be the object of detection.

Furthermore, since the movable rod is shifted in the direction in which the amount of projection increases by the hydraulic pressure in at least the single hydraulic pressure operation chamber between the piston portion and the head side end wall, accordingly this is appropriate for detecting the position of the piston member when the piston member has shifted in the direction to advance the output rod by a predetermined amount, or to the maximum limit.

In the first preferable aspect, since the movement restriction mechanism comprises the large diameter portion, the seal member, the large diameter hole portion, the annular concave portion, the ball holding opening, the plurality of balls, and the small diameter hole and the large diameter hole that are formed in the rod insertion hole, accordingly, when the lower end of the piston portion is in the first region, the plurality of balls are engaged with the annular concave portion via the small diameter hole, and shifting of the movable rod is restrained; while, when the lower end of the piston portion is in the second region, the plurality of balls are allowed to escape from the annular concave portion via the large diameter hole, and the movable rod is shifted in the direction to increase its amount of projection by the hydraulic pressure in the hydraulic pressure operation chamber. After the movable rod has shifted, it is possible to detect with the detection switch that the lower end of the piston portion is in the second region within the cylinder bore. This movement restriction mechanism has a simple structure and its durability is excellent, and it is possible to form its major portion within the hydraulic cylinder.

In the second preferable aspect, since the installation hole defining wall portion of the head side end wall that forms a portion of the rod fitting hole and the auxiliary rod are constituted by a unitary auxiliary rod member, and the auxiliary rod member is detachably fixed to the cylinder main body in order for it to be possible to exchange of the auxiliary rod member for an auxiliary rod member having a different length, accordingly it is possible to change the first and second regions and to change the position of the piston member which is the object of detection by exchanging of the auxiliary rod member for an auxiliary rod member having a different length, and it is possible to reduce the cost of production, as compared with a case in which the auxiliary rod is formed integrally with the head side end wall.

In the third preferable aspect, since, the male screw portion is formed on the external circumferential portion of the auxiliary rod member, and this auxiliary rod member is screwed into the threaded hole formed in the head side end wall so as to be engaged thereto and is locked with the lock nut and sealed with the seal washer, accordingly it is possible to adjust the protrusion length of the auxiliary rod member toward the cylinder bore in an appropriate manner, and it is thereby possible to change the first and second regions, so that it is possible to change the position of the piston member that is to be the object to be detected.

In the fourth preferable aspect, since the small diameter hole forming member, the sliding hole in which this small diameter hole forming member is installed so as to slide freely, the threaded hole more to the end thereof than the sliding hole, the screw shaft that is formed integrally with the small diameter hole forming member and that is screwed into and engaged with the threaded hole, and the tool engagement hole at the tip end portion of the screw shaft are provided, accordingly it is possible to change the first and second regions by adjusting the position of the small diameter hole forming member in the axial direction and thereby changing the length of the large diameter hole.

In the fifth preferable aspect, since the compression spring that biases the movable rod toward the interior of the rod insertion hole is provided, accordingly the movable rod does not shift even though the lower end of the piston portion is positioned in the second region, and, the movable rod only shifts when the hydraulic pressure in the hydraulic pressure operation chamber becomes greater than the predetermined pressure, at which time the hydraulic pressure that operates on the movable rod has become greater than the biasing force of the compression spring. It is only possible for detection to be performed by the detection switch when both the condition on the position of the piston member and also the condition on the hydraulic pressure in the hydraulic pressure operation chamber are satisfied.

In the sixth preferable aspect, when the lower end of the piston portion is in the second region, the piston portion contacts against or approaches the rod side end wall. Due to this, the movable rod shifts when the piston portion contacts against or approaches the rod side end wall, and this can be detected by the detection switch.

In the seventh preferable aspect, when the lower end of the piston portion is in the second region, the piston portion is positioned at an intermediate portion of the cylinder bore in its length direction. Due to this, the movable rod shifts when the piston member is positioned at the intermediate portion of the cylinder bore in its length direction, and this can be detected by the detection switch.

According to the present second invention, it is possible to implement a hydraulic pressure driven type clamp device, to which a hydraulic cylinder according to the present invention is installed.

According to the present third invention, since it is possible for the rod insertion hole, the auxiliary rod, the rod installation hole, the movable rod, and the major portion of the movement restriction mechanism to be provided within the hydraulic cylinder, accordingly it is possible to prevent increase in the size of the clamp device due to the various members and mechanisms for detection. Moreover, via the movement restriction mechanism, it is possible freely to set the unclamp position and the clamp position of the piston member.

Furthermore, since the movable rod is shifted in the direction in which the amount by which it projects increases by the hydraulic pressure in at least the single hydraulic pressure operation chamber between the piston portion and the head side end wall, accordingly this is appropriate for detecting the position of the piston member when the piston member has shifted in the direction to advance the output rod by a predetermined amount, or to the maximum limit.

DESCRIPTION OF EMBODIMENTS

In the following, various forms for implementation of the present invention will be explained on the basis of various embodiments thereof.

Embodiment #1

A work pallet 1, first and second hydraulic pressure driven type clamp devices 2A, 2B provided to the work pallet 1 of a first embodiment will now be explained on the basis of FIGS. 1 through 4. The work pallet 1 is based on a thick rectangular plate made from steel, and this work pallet 1 is a device that conveys a workpiece W to a table of a machining center (not shown in the figures) in a fixed state, so that the workpiece W can be presented for machining.

A stopping jig 4 for receiving and stopping the workpiece W is fixed to one edge portion of the upper surface of the work pallet 1, and push type first and second clamp devices 2A, 2B that are oriented toward the workpiece W in a horizontal attitude are provided at the other edge portion of the upper surface of the work pallet 1, with the first and second clamp devices 2A, 2B being fixed to a clamp installation member 3 that is fixed to the work pallet 1. A pair of workpiece reception units 4a are provided at a side portion of the stopping jig 4 with a gap between them. The workpiece W is pressed by the first and second clamp devices 2A, 2B against the workpiece reception units 4a of the stopping jig 4, and is thereby clamped.

The first and second clamp devices 2A, 2B will now be explained in the following description, with an example being explained in which the first and second clamp devices 2A, 2B are oriented in a vertical attitude.

Figure 1:
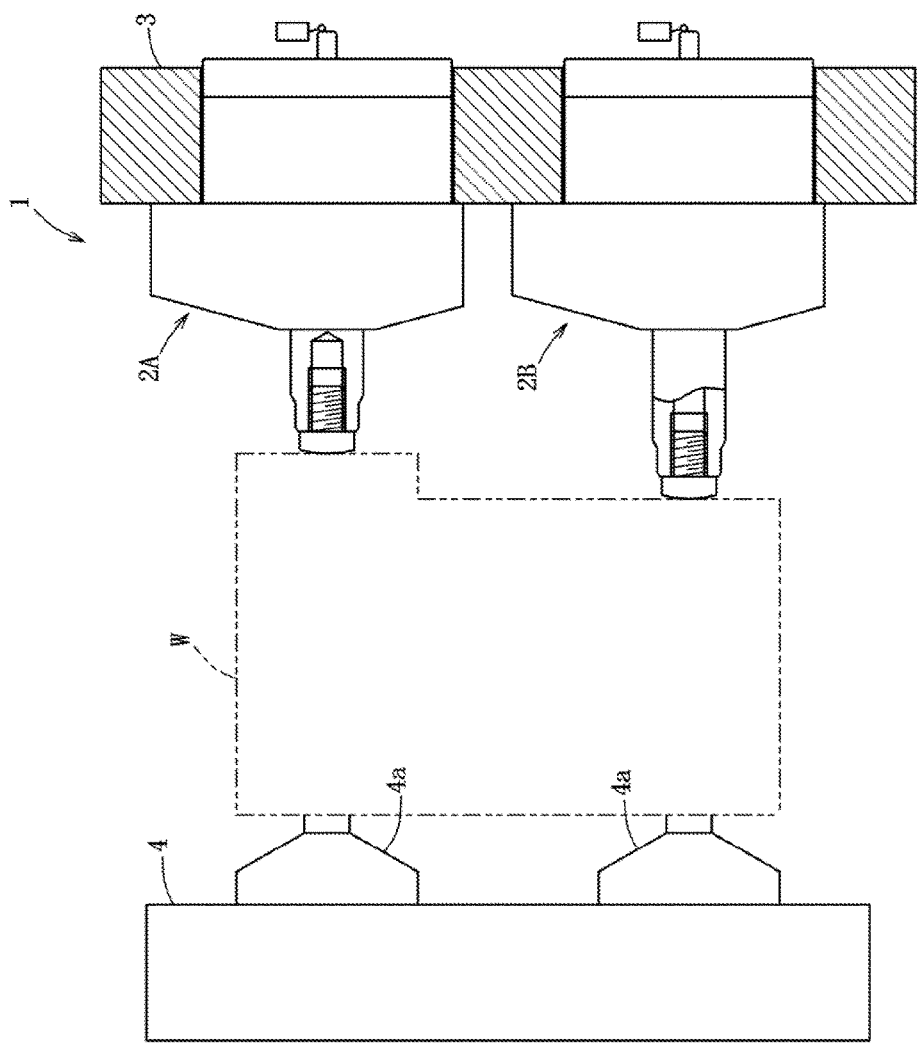
FIG. 1 is a plan view of a work pallet and a clamp device and so on, according to a first embodiment of the present invention.
Figure 2:
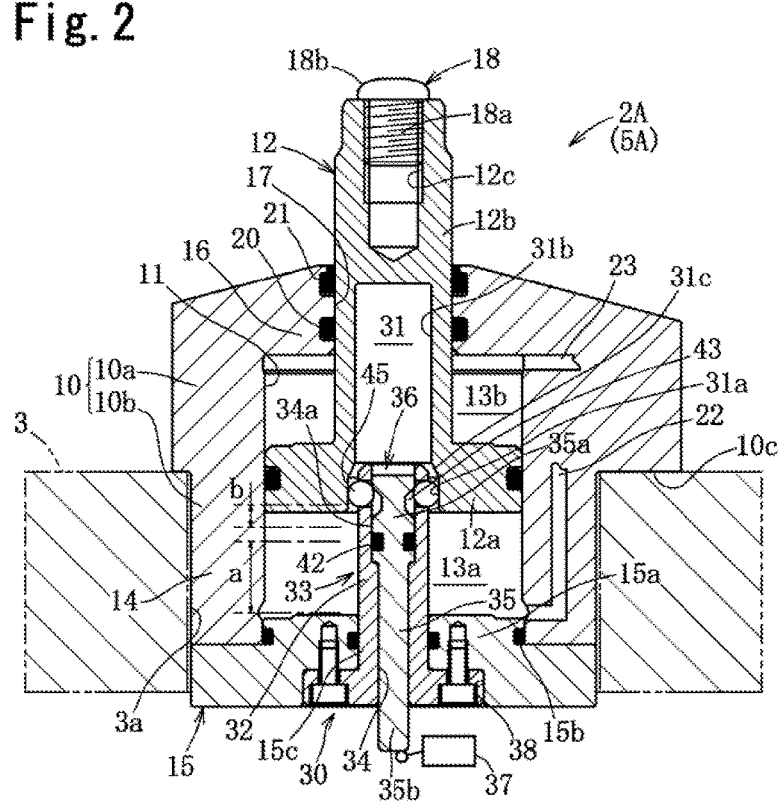
FIG. 2 is a sectional view of a first clamp device that is provided to the work pallet (clamped state)
Figure 3:
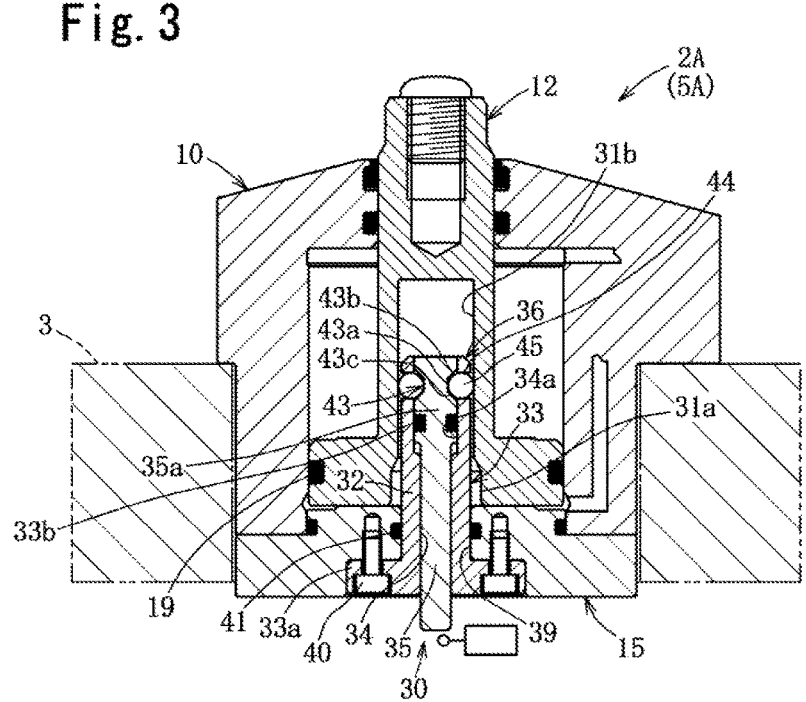
FIG. 3 is a sectional view of this first clamp device (unclamped state)

Initially, the first clamp device 2A will be explained. Since, as shown in FIGS. 2 and 3, the first clamp device 2A principally comprises a hydraulic cylinder 5A, accordingly the following explanation will also include an explanation of this hydraulic cylinder 5A. While, in the case of this embodiment, the hydraulic cylinder 5A employs pressurized hydraulic fluid for its pressure fluid, it would also be acceptable to utilize an air cylinder that employs pressurized air, instead of pressurized hydraulic fluid. It should be understood that, in the following explanation, pressurized hydraulic fluid is sometimes referred to as pressurized oil.

As basic structure, the first clamp device 2A comprises a cylinder main body 10, a cylinder bore 11 that is formed in the cylinder main body 10 in a vertical orientation, a piston member 12, and first and second hydraulic pressure operation chambers 13a, 13b. The cylinder main body 10 comprises an upper main body portion 10a and a lower main body portion 10b, with the lower main body portion 10b being fitted into a cylindrical holding hole 3a in the clamp installation member 3, an installation surface 10c at the lower end of the upper main body portion 10a being contacted against the upper surface of the clamp installation member 3, and the upper main body portion 10a being fixed to the clamp installation member 3 by a plurality of bolts (not shown in the figures).

The lower main body portion 10b includes a cylindrical portion 14 and a plate shaped head side end wall member 15 that blocks the lower end of the cylinder bore 11, with a fitting portion 15a that is fitted into the lower end portion of the cylinder bore 11 being formed at the upper side portion of this head side end wall member 15, and the head side end wall member 15 being fixed to the lower end of the cylindrical portion 14 by a plurality of bolts (not shown in the figures). A seal member 15b is installed on the external periphery of a portion of the fitting portion 15a, near its lower end portion.

The piston member 12 comprises a piston portion 12a that is installed in the cylinder bore 11 so as to be movable in its axial direction (i.e. so as to slide freely therein), and an output rod 12b that passes through a rod hole 17 formed in a rod side end wall 16 of the upper main body portion 10a and that extends upward from the piston portion 12a and projects to the exterior of the cylinder main body 10; and a threaded hole 12c is formed at the upper end portion of the output rod 12b so as to open to the upper end thereof, with a foot portion 18a of a pressing member 18 that presses on the workpiece W being screwed into and engaged with the threaded hole 12c, and a head portion 18b of the pressing member being exposed at the upper end of the output rod 12b. The upper surface of the head portion 18b of the pressing member 18 is shaped as a part spherical surface, or as a curved shape which is close to being a part spherical surface.

A seal member 19 is installed on an external circumferential portion of the piston portion 12a, and a seal member 20 and a scraper 21 are installed in the inner peripheral portion of the rod hole 17. It should be understood that it would also be acceptable to make the piston member 12 with a plurality of members.

The first hydraulic pressure operation chamber 13a is an operation chamber for clamping that is defined within the cylinder bore 11, between the piston portion 12a and the head side end wall member 15 (i.e. the head side end wall). It should be understood that the wall portion of the head side end wall member 15 that corresponds to the cylinder bore 11 is the "head side end wall".

And the second hydraulic pressure operation chamber 13b is an operation chamber for unclamping that is defined within the cylinder bore 11, between the piston portion 12a and the rod side end wall 16. A first hydraulic conduit 22 for supplying pressurized hydraulic fluid to the first hydraulic pressure operation chamber 13a and discharging it therefrom and a second hydraulic conduit 23 for supplying pressurized hydraulic fluid to the second hydraulic pressure operation chamber 13b and discharging it therefrom are formed in the wall portion of the cylinder main body 10, and these first and second hydraulic conduits 22, 23 are connected to a hydraulic pressure supply source (not shown in the figures).

The second hydraulic pressure operation chamber 13b can be omitted; it would also be acceptable to form a vent passage instead of the second hydraulic conduit 23, and, instead of the second hydraulic pressure operation chamber 13b, to install a compression spring that elastically biases the piston portion 12a downwards in a spring installation chamber.

Next, an operational state detection mechanism 30 will be explained that is provided to the first clamp device 2A, and that is characteristic of the present invention. This operational state detection mechanism 30 comprises a rod insertion hole 31, an auxiliary rod member 33 that includes an auxiliary rod 32, a rod fitting hole 34, a movable rod 35, a movement restriction mechanism 36, a detection switch 37, and so on.

The rod insertion hole 31 is formed in the piston portion 12a and a portion of the output rod 12b, so as to communicate with the first hydraulic pressure operation chamber 13a. The rod insertion hole 31 includes a large diameter hole 31a at its lower end portion and a small diameter hole 31b that is connected to the upper end of the large diameter hole 31a via a short tapered hole 31c. An auxiliary rod 32 is provided so as to project within the cylinder bore 11 on the head side end wall member 15 (i.e. the head side end wall), and moreover so as to be capable of being inserted into the rod insertion hole 31.

However, in this embodiment, an fitting hole forming wall portion 15c of the head side end wall member 15 that forms a portion of the rod fitting hole 34, and the auxiliary rod 32, are both constituted with a single integrally formed auxiliary rod member 33, and the auxiliary rod member 33 is detachably fixed to the cylinder main body 10, in order to make it possible to exchange of the auxiliary rod member 33 for another auxiliary rod member 33B whose length is different from that of this auxiliary rod member 33. The fitting hole forming wall portion 15c and the auxiliary rod 32 are formed to have equal external diameters, and the auxiliary rod 32 is formed over approximately the upper ⅔ portion of the auxiliary rod member 33. In the case of this embodiment, the upper end of the auxiliary rod 32 is positioned at an intermediate portion of the cylinder bore 11.

A flange portion 33a is formed at the lower end portion of the auxiliary rod member 33, and a circular concave portion 38 into which the flange portion 33a is fitted and a vertically oriented communication hole 39, which can pass the auxiliary rod 32 and which communicates to the center portion of the circular concave portion 38, are formed in the head side end wall member 15. In the state in which the auxiliary rod member 33 is inserted into the cylinder bore 11 from the communication hole 39, and the flange portion 33a is fitted into the circular concave portion 38, the flange portion 33a is fixed to the head side end wall member 15 by a plurality of bolts 40. And a seal member 41 is installed to the internal circumferential portion of the communication hole 39.

In this manner, the auxiliary rod 32 projects from the upper surface of the head side end wall member 15 into the cylinder bore 11, and the auxiliary rod 32 can be inserted into the rod insertion hole 31. However, the flange portion 33a is not essential; it would also be acceptable to fix the auxiliary rod member 33 to the head side end wall member 15 with a fixing construction that is different from the fixing construction employing the flange portion 33a, described above.

The rod fitting hole 34 is formed so as to penetrate the head side end wall member 15 and the auxiliary rod 32 in the axial direction. However, in the case of this embodiment, the lower end portion of the rod fitting hole 34 is formed in the fitting hole forming wall portion 15c, which is one portion of the head side end wall member 15. And the movable rod 35 is installed in the rod fitting hole 34 so as to slide freely therein in the vertical direction, and moreover the end portion thereof on the side of the head side end wall member 15 projects to the exterior from the rod fitting hole 34.

The movement restriction mechanism 36 prohibits shifting of the movable rod 35 in the axial direction in the state in which the lower end of the piston portion 12a is positioned at a first region within the cylinder bore 11, also, in the state in which the lower end of the piston portion 12a is positioned at a second region within the cylinder bore 11, the movement restriction mechanism 36 permits shifting of the movable rod 35 in the axial direction, so that, due to hydraulic pressure in the rod insertion hole 31, the movable rod 35 is caused to shift by a predetermined distance in the direction that increases an amount of projection by which it projects to the exterior from the rod fitting hole 34. In the case of this embodiment, the first region is the region a within the cylinder bore 11 shown in FIG. 2, while the second region is the region b within the cylinder bore 11 shown in FIG. 2. When the lower end of the piston portion 12a is in the second region b, the piston portion 12a is positioned at an intermediate portion of the cylinder bore 11 in its lengthwise direction.

Thus, the movement restriction mechanism 36 prohibits shifting of the movable rod 35 in the axial direction in the state in which the piston member 12 is in its unclamp position, also, in the state in which the piston member 12 is in its clamp position, the movement restriction mechanism 36 permits shifting of the movable rod 35 in the axial direction, so that, due to hydraulic pressure in the rod insertion hole 31, the movable rod 35 is caused to shift by a predetermined distance in the direction that increases the amount of projection by which it projects to the exterior from the rod installation hole 34. Due to the shape of the workpiece W that is fixed by the first and second clamp devices 2A, 2B, the first clamp device 2A goes into the clamped state in the state in which the piston portion 12a has shifted forward by about ½ of its full stroke. On the other hand, the second clamp device 2B goes into the clamped state in the state in which the piston member 21 has shifted forward to near its full stroke.

The movement restriction mechanism 36 comprises: a large diameter portion 35a at the tip end portion of the movable rod 35 (i.e. at its upper end portion) that is formed to have a larger diameter than its other portion (i.e. a small diameter portion 35b); a seal member 42 that is installed over the external circumferential portion of the large diameter portion 35a; a large diameter hole portion 34a that is formed in a portion of the rod fitting hole 34 and that allows the large diameter portion 35a to be movable in the axial direction; an annular concave portion 43 that is formed around the external circumferential portion of the large diameter portion 35a of the movable rod 35; a plurality of ball holding openings 44 that are formed in the cylindrical circumferential wall 33b of the auxiliary rod 32 where its external peripheral surface fits into the large diameter hole portion 34a; a plurality of balls 45 (steel balls) that are received in the plurality of ball holding openings 44 so as to be individually movable in radial directions, and that are capable of being partially engaged with the annular concave portion 43; and a small diameter hole 31b and a large diameter hole 31a that are formed in the rod insertion hole 31.

The small diameter hole 31b is formed so that, when the lower end of the piston portion 12a is in the first region a, the plurality of balls 45 are partially engaged into the annular concave portion 43 (refer to FIG. 3). And the large diameter hole 31a is formed so that, when the lower end of the piston portion 12a is in the second region b, the plurality of balls 45 are allowed to escape from the annular concave portion 43 (refer to FIG. 2). The short tapered hole 31c that extends along the axial direction is formed at the boundary portion between the small diameter hole 31b and the large diameter hole 31a. The half cross section of the annular concave portion 43 is an isosceles trapezoid: the annular concave portion 43 is defined by a small diameter cylindrical surface 43a, an upper part conical surface 43b that connects to the upper end of the cylindrical surface 43a, and a lower part conical surface 43c that connects to the lower end of the cylindrical surface 43a. Even when the plurality of balls 45 are contacted against the inner circumferential surface of the large diameter hole 31a, very small portions of the balls 45 are still projected into the annular concave portion 43.

A detection switch 37 is provided that detects whether or not the movable rod 35 has shifted and outputs a detection signal; this detection switch 37 is built with a limit switch or a proximity switch or the like, and is attached to the outer surface of the head side end wall member 15. When the movable rod 35 shifts in the direction to increase its amount of projection, the detection signal of the detection switch 37 is set to go to ON, and the detection signal of the detection switch 37 is supplied to a control unit (not shown in the figures) that controls a hydraulic pressure supply source or the like.

Figure 4:
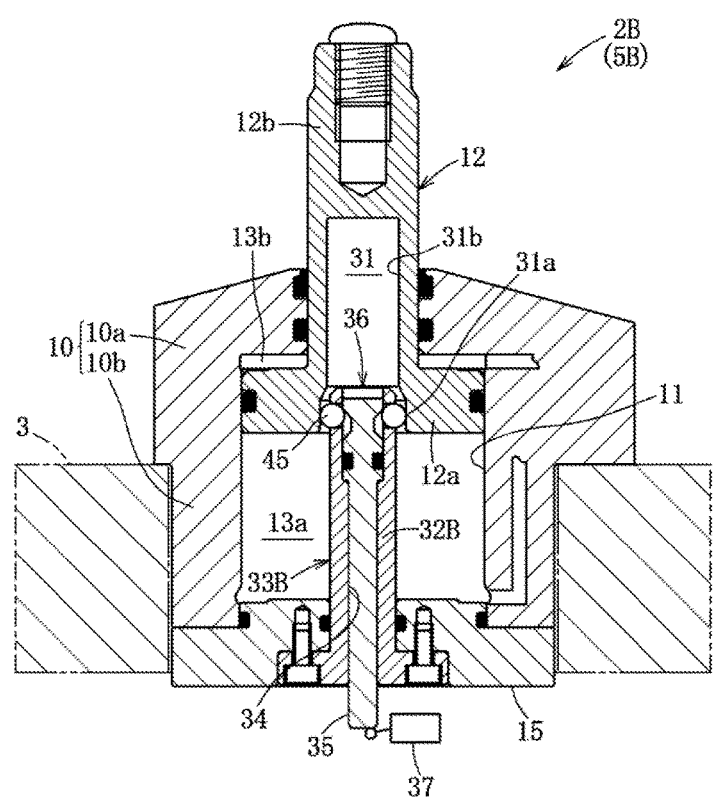
FIG. 4 is a sectional view of a second clamp device that is provided to the work pallet (clamped state)

The second clamp device 2B shown in FIG. 4 (clamped state) includes a hydraulic cylinder 5B and fundamentally has a similar construction to that of the first clamp device 2A, but is built so as to go into the clamped state in the state in which the piston member 12 has shifted forward to near its full stroke; and, when the lower end of the piston portion 12a is in the second region, the piston portion 12a contacts against or is near to the rod side end wall 16. Due to this, the auxiliary rod 32B of the auxiliary rod member 33B is formed to be longer than the auxiliary rod 32 of the first clamp device 2A. To structural elements that are similar in structure to structural elements of the first clamp device 2A, the same reference numerals are appended, and description thereof is omitted.

The operation of these first and second clamp devices 2A, 2B and their beneficial effects will now be explained.

However, since the first and second clamp devices 2A, 2B operate in similar ways and provide similar advantageous effects, accordingly only the operation of the first clamp device 2A and its advantageous effects will be explained. When hydraulic pressure is charged into the second hydraulic pressure operation chamber 13b, the first clamp device 2A goes into its unclamped state shown in FIG. 3. Since, in this state, the piston portion 12a of the piston member 12 is lowered down to its lower limit position, accordingly the plurality of balls 45 are positioned within the small diameter hole 31b and are engaged to the annular concave portion 43. Due to this, even though hydraulic pressure is acting on the upper end of the movable rod 35, the movable rod 35 is not shifted to project, and accordingly the detection signal of the detection switch 37 remains at OFF.

Next, when hydraulic pressure is charged into the first hydraulic pressure operation chamber 13a, the first clamp device 2A goes into the clamped state shown in FIG. 2. Since, in this state, the piston portion 12a of the piston member 12 is positioned at an intermediate portion of the cylinder bore 11, the plurality of balls 45 are positioned within the large diameter hole 31a, and the hydraulic pressure within the rod insertion hole 31 acts on the upper end of the movable rod 35, accordingly the plurality of balls 45 are pressed by the upper part conical surface 43b of the annular concave portion 43 and move radially outward, so that they become in the state of being almost removed from the annular concave portion 43.

Due to this, the movable rod 35 shifts downward until the lower end of the large diameter portion 35a comes into contact against the lower end of the large diameter hole portion 34a, and, since the amount of projection of the movable rod 35 increases, the movable rod 35 changes over the detection switch 37, so that the detection signal of the detection switch 37 goes to ON. Due to this, the control unit understands that the first clamp device 2A has transitioned to its clamped state.

Since, in the first clamp device 2A, the rod insertion hole 31, the auxiliary rod 32, the rod fitting hole 34, the movable rod 35, and the major portion of the movement restriction mechanism 36 can be provided within the hydraulic cylinder 5A, accordingly it is possible to prevent increase in size of the hydraulic cylinder 5A due to the provision of the above described movement restriction mechanism 36. Moreover since, in the movement restriction mechanism 36, it is possible to set the first and second regions a, b freely via the small diameter hole 31b and the large diameter hole 31a, accordingly it is possible freely to set the position of the object of detection, i.e. the piston member 12.

Furthermore, since the movable rod 35 is shifted in the direction to increase its amount of projection at least by the hydraulic pressure in the single first hydraulic pressure operation chamber 13a between the piston portion 12a and the head side end wall member 15, accordingly this is appropriate for detection of the position of the piston member 12 when the piston member 12 has shifted by a predetermined amount in the direction to advance the output rod, or by the maximum limit amount.

Since the movement restriction mechanism 36 comprises the large diameter portion 35a, the seal member 42, the large diameter hole portion 34a, the annular concave portion 43, the ball holding openings 44, the plurality of balls 45, and the small diameter hole 31b and the large diameter hole 31a that are formed in the rod insertion hole 31, accordingly, when the lower end of the piston portion 12a is in the first region a, the plurality of balls 45 are engaged to the annular concave portion 43 via the small diameter hole 31b, and the movable rod 35 is restrained so that it does not shift; and, when the lower end of the piston portion 12a is in the second region b, the plurality of balls 45 are almost removed out from the annular concave portion 34 via the large diameter hole 31a, and the movable rod 35 is shifted in the direction to increase its amount of projection due to the hydraulic pressure in the first hydraulic pressure operation chamber 13a. And, from the shifting of the movable rod 35, it is possible to detect with the detection switch 37 the fact that the lower end of the piston portion 12a is in the second region b within the cylinder bore 11. Moreover, the movement restriction mechanism 36 has a simple structure and excellent durability, and its major portion can be formed within the hydraulic cylinder 5A.

Since, in the head side end wall member 15, the fitting hole forming wall portion 15c that forms the rod fitting hole 34 and the auxiliary rod 32 are constituted by the single integral auxiliary rod member 33, and since the auxiliary rod member 33b is detachably fixed to the cylinder main body 10 in order to be possible to exchange of the auxiliary rod member 33 for an auxiliary rod member 33B whose length is different, accordingly, not only is it possible to change the first and second regions a, b by exchanging of the auxiliary rod member 33 for an auxiliary rod member 33B whose length is different, so that it is possible to change the position of the piston member 12 which is the object for detection, but also it is possible to reduce the cost of production, as compared to the case when the auxiliary rod 32 is formed integrally with the head side end wall member 15 (i.e. with the head side end wall).

Embodiment #2

Figure 5:
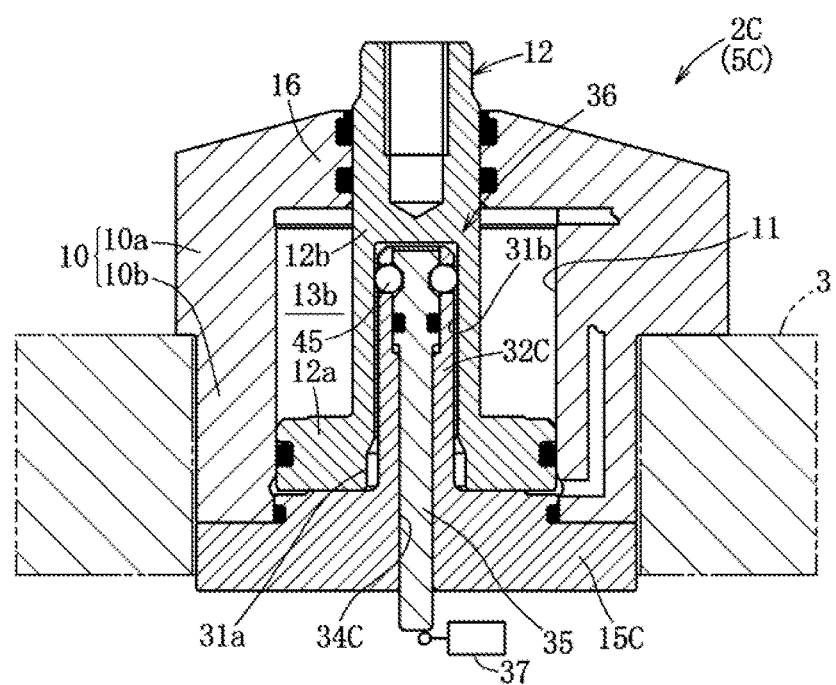
FIG. 5 is a sectional view of a clamp device according to a second embodiment (unclamped state)

Since a clamp device 2C of a second embodiment and a hydraulic cylinder 5C that is included therein are fundamentally similar to the first embodiment, accordingly the same reference numerals are appended to structural elements that are the same as in the first embodiment and explanation thereof will be omitted, and principally only structures that are different from the first embodiment will be explained on the basis of FIGS. 5 and 6.

Figure 6:
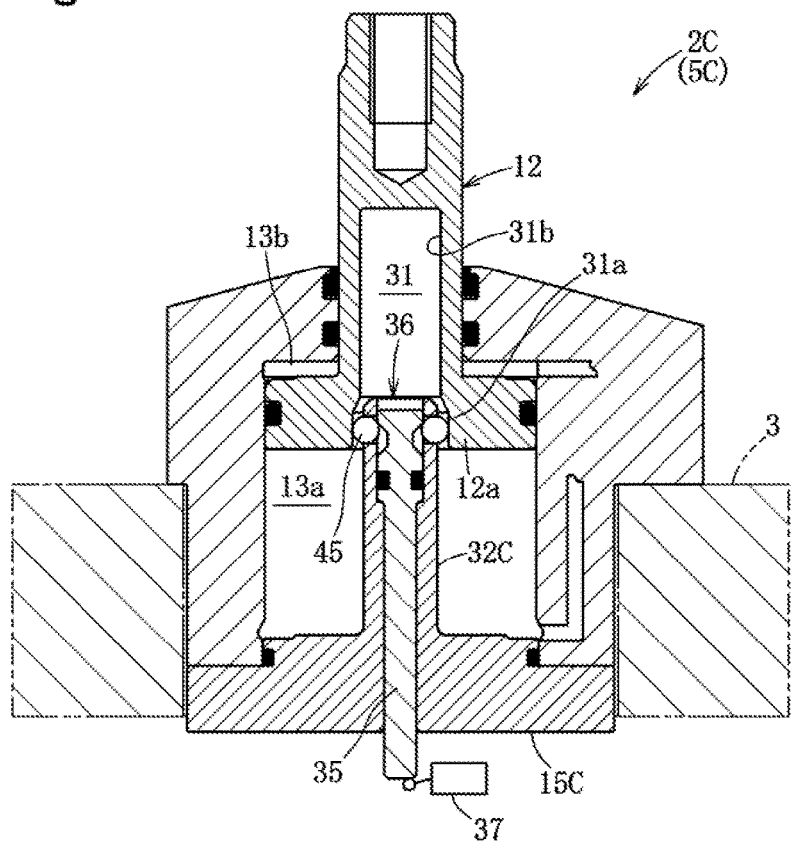
FIG. 6 is a sectional view of the clamp device of FIG. 5 (clamped state)

In this clamp device 2C, the auxiliary rod 32C is formed integrally with the head side end wall member 15C, and the auxiliary rod 32C is formed so as to project within the cylinder bore 11; and, when the lower end of the piston portion 12a is in the second region as in FIG. 6, the piston portion 12a contacts against or approaches the rod side end wall 16. The rod fitting hole 34C is formed so as to penetrate through the auxiliary rod 32C and through the head side end wall member 15C, parallel to the axis of the cylinder bore 11. Even when this auxiliary rod 32C is employed, it is still possible to exchange the auxiliary rod 32C by exchanging the head side end wall member 15C. Since almost similar operation and beneficial effects are obtained as those obtained with the first and second clamp devices 2A, 2B of the first embodiment, accordingly explanation thereof will be omitted.

Embodiment #3

Since a clamp device 2D of a third embodiment and a hydraulic cylinder 5D that is included therein are fundamentally similar to the first embodiment, accordingly the same reference numerals are appended to structural elements that are the same as in the first embodiment and explanation thereof will be omitted, and principally only structures that are different from the first embodiment will be explained on the basis of FIG. 7. In this clamp device 2D, the auxiliary rod member 33D that includes the auxiliary rod 32D is fixed to the head side end wall member 15D via a position adjustment mechanism 50. And a concave portion 51 whose lower end is open is formed in the head side end wall member 15D.

The position adjustment mechanism 50 comprises: a male screw portion 52 that is formed on a portion of the external circumferential portion of the auxiliary rod member 33D; a threaded hole 53 that is formed in the center portion of the head side end wall member 15D so as to be oriented vertically, and into which the male screw portion 52 of the auxiliary rod member 33D is screwed and is engaged; a lock nut 54 that is screwed over and engaged with the male screw portion at the exterior of the threaded hole 53; and a seal washer 55 that is fitted over the exterior of the auxiliary rod member 3D, between the head side end wall 15d and the lock nut 54. The male screw portion 52 is formed on the entire external circumferential portion of the auxiliary rod member 33D, with the exception of its upper end portion. It will be supposed that, during assembly of the clamp device 2D, the head side end wall member 15D is fixed to the cylindrical portion 14 of the lower main body portion 10b after the auxiliary rod member 33D is attached to the head side end wall member 15D.

Figure 7:
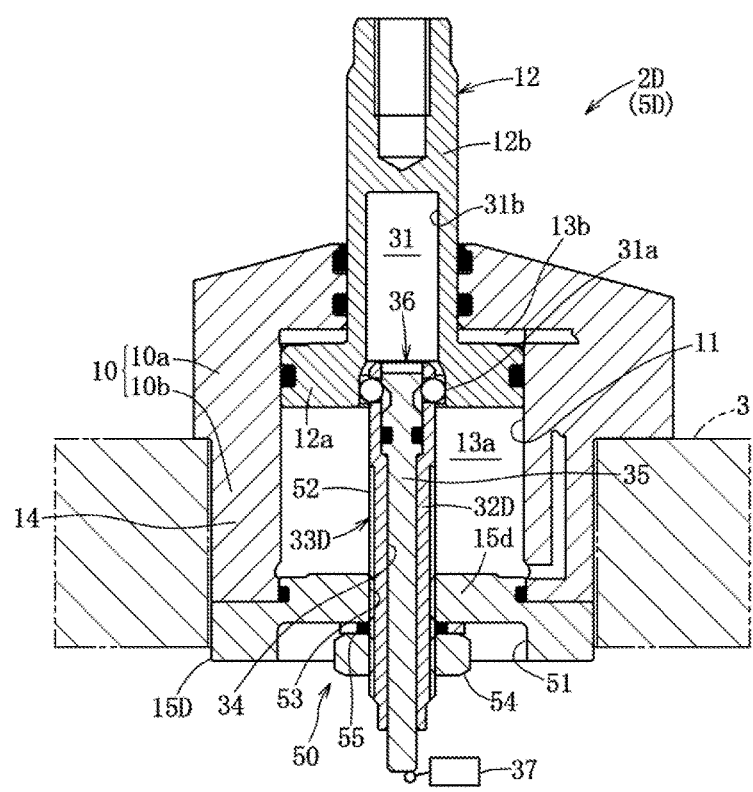
FIG. 7 is a sectional view of a clamp device according to a third embodiment (clamped state)

Although FIG. 7 shows the state when the clamp device 2D is in the clamped state, if due to the size or the shape of the workpiece the piston portion 12a is positioned partway along the cylinder bore 11 (i.e. at an intermediate portion) when the clamp device 2D reaches its clamped state, then it is possible to perform position adjustment via the position adjustment mechanism 50 so as to increase the amount of projection to the exterior of the auxiliary rod member 33D; and accordingly the versatility is excellent. Apart from the above, almost similar operation and beneficial effects are obtained as those obtained with the first and second clamp devices 2A, 2B of the first embodiment.

Embodiment #4

Figure 8:
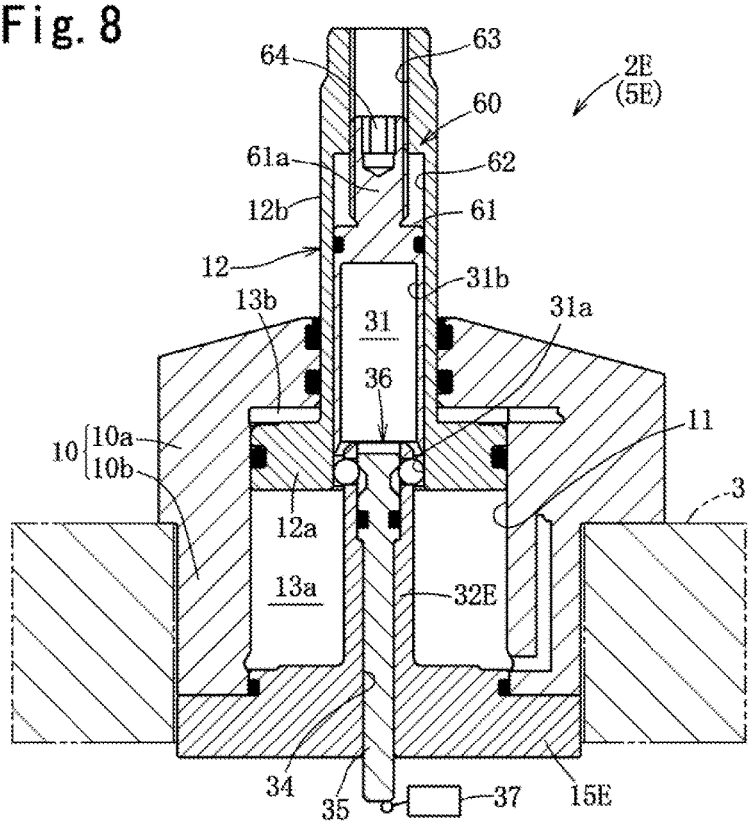
FIG. 8 is a sectional view of a clamp device according to a fourth embodiment (clamped state)

Since a clamp device 2E of a fourth embodiment and a hydraulic cylinder 5E that is included therein are fundamentally similar to the first embodiment, accordingly the same reference numerals are appended to structural elements that are the same as in the first embodiment and explanation thereof will be omitted, and principally only structures that are different from the first embodiment will be explained on the basis of FIG. 8. In this clamp device 2E, an auxiliary rod 32E is formed integrally with the head side end wall member 15E, and projects into the cylinder bore 11.

This clamp device 2E has a large diameter hole length adjustment mechanism 60 that is capable of adjusting the length of the large diameter hole 31a, and this large diameter hole length adjustment mechanism 60 comprises a small diameter hole forming member 61 that forms a small diameter hole 31b in the piston member 12, a sliding hole 62 that is formed in the piston member 12 and in which the small diameter hole definition member 61 is installed so as to slide freely in the axial direction and that is of the same diameter as the large diameter hole 31a, a threaded hole 63 that is formed in the output rod 12b further toward its end than the sliding hole 62, a screw shaft 61a that is formed integrally with the small diameter hole forming member 61 and that is screwed into and engaged with the threaded hole 63, and a tool engagement hole 64 that is formed at the tip end portion of the screw shaft 61a; and, with this structure, it is possible to adjust the position of the small diameter hole forming member 61 with respect to the piston member 12 through a predetermined distance in the vertical direction.

It is possible to increase or decrease the length of the large diameter hole 31a by engaging a wrench into the tool engagement hole 64 and rotating the small diameter hole definition member 61, and by thus adjusting the position of the small diameter hole forming member 61 in the vertical direction with the threaded hole 63 and the screw shaft 61a. For example, if the mechanism is to be set so as to be in the clamped state when the piston portion 12a is in a lower position than its position in FIG. 8, then the position of the small diameter hole forming member 61 in the vertical direction may be adjusted so as to make the length of the large diameter hole 31a longer. Since it is possible to adjust the length of the large diameter hole 31a in this manner via the large diameter hole adjustment mechanism 60, accordingly the versatility is excellent. Apart from the above, almost similar operation and beneficial effects are obtained as those obtained with the first and second clamp devices 2A, 2B of the first embodiment.

Embodiment #5

Since a clamp device 2F of a fifth embodiment and a hydraulic cylinder 5F that is included therein are fundamentally similar to the first embodiment, accordingly the same reference numerals are appended to structural elements that are the same as in the first embodiment and explanation thereof will be omitted, and principally only structures that are different from the first embodiment will be explained on the basis of FIGS. 9 and 10. In this clamp device 2F, an auxiliary rod 32F is formed integrally with the head side end wall member 15F, and projects to within the cylinder bore 11.

This clamp device 2F has a hydraulic pressure responsive mechanism 70 that is responsive to the hydraulic pressure within the first hydraulic pressure operation chamber 13a, and this hydraulic pressure responsive mechanism 70 comprises a spring installation hole 71 that is formed in the auxiliary rod 32F so as to communicate with the large diameter hole portion 34a and a compression coil spring 72 that biases a movable rod 35 that is installed in a portion of the large diameter hole portion 34a and in the spring installation hole 71 toward the inner end (i.e. the upper end) of the rod insertion hole 31.

Figure 9:
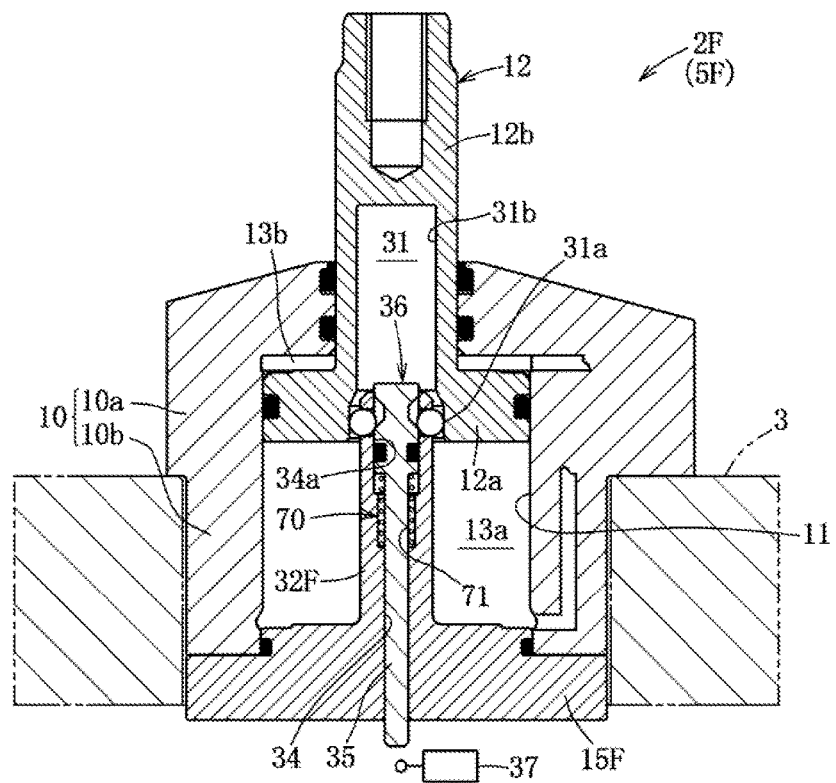
FIG. 9 is a sectional view of a clamp device according to a fifth embodiment (unclamped state)
Figure 10:
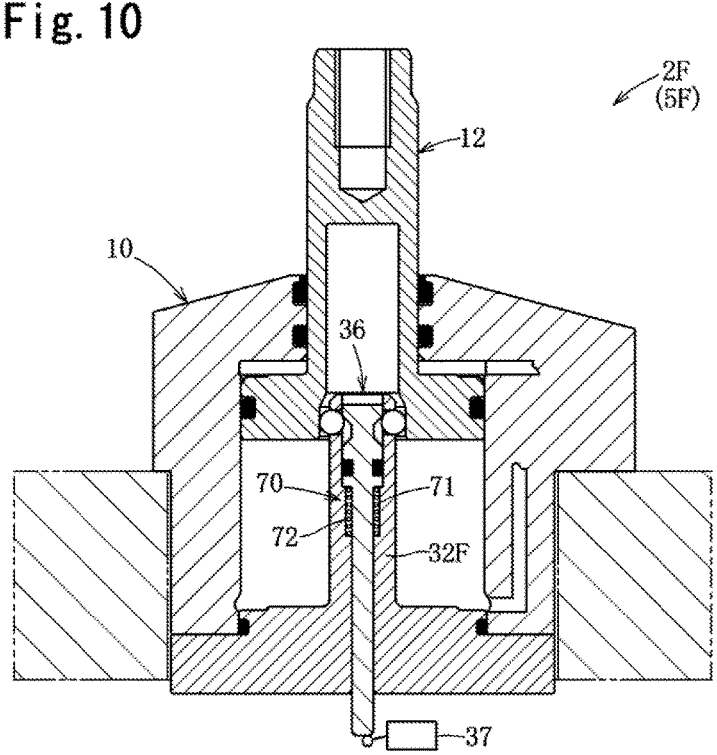
FIG. 10 is a sectional view of the clamp device of FIG. 9 (clamped state)

With this clamp device 2F, even when the piston member 12 is in the clamped state, while the hydraulic pressure within the first hydraulic pressure operation chamber 13a is less than a set pressure that is set to the compression spring 72, since the biasing force of the compression spring 72 is greater than the fluid pressure that operates on the movable rod 35, accordingly the movable rod 35 is held in its upper limit position as shown in FIG. 9. But, when the hydraulic pressure within the first hydraulic pressure operation chamber 13a becomes greater than or equal to the set pressure, since this fluid pressure becomes greater than the biasing force of the compression spring 72, accordingly the movable rod 35 is lowered to its lower limit position as shown in FIG. 10, and the detection switch 37 is changed over to ON.

Embodiment #6

Figure 11:
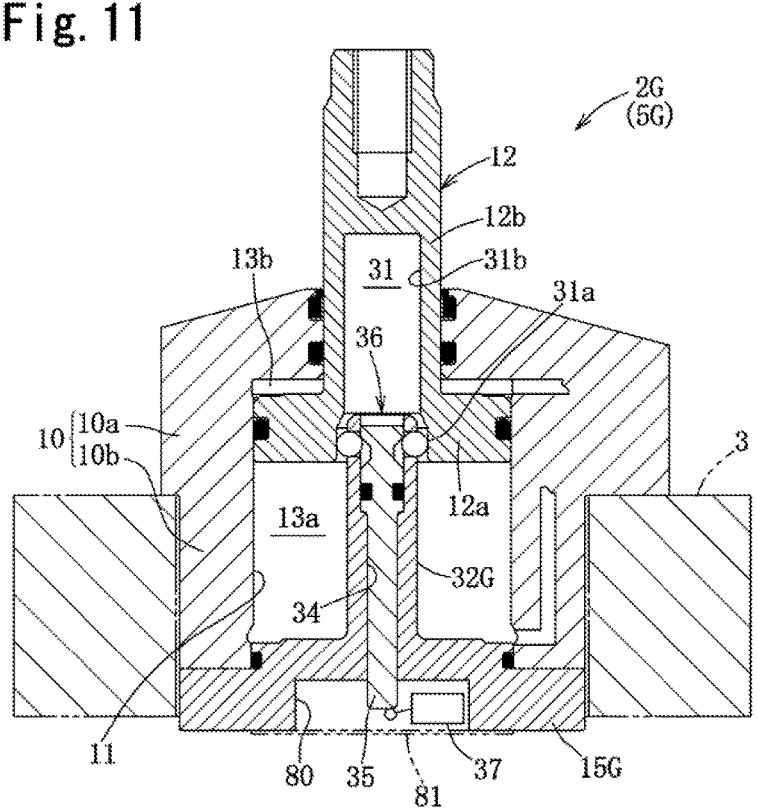
FIG. 11 is a sectional view of a clamp device according to a sixth embodiment (clamped state).

Since a clamp device 2G of a sixth embodiment and a hydraulic cylinder 5G that is included therein are fundamentally similar to the first embodiment, accordingly the same reference numerals are appended to structural elements that are the same as in the first embodiment and explanation thereof will be omitted, and principally only structures that are different from the first embodiment will be explained on the basis of FIG. 11. In this clamp device 2G, an auxiliary rod 32G is formed integrally with the head side end wall member 15G, and projects to within the cylinder bore 11.

With this clamp device 2G, the thickness of the head side end wall member 15G is made to be great, and a switch reception concave portion 80 having its lower end open is formed in the lower portion of the central portion of the head side end wall member 15G, with a detection switch 37 being received in the switch reception concave portion 80 and being fixed to a wall portion of the switch reception concave portion 80, and with the lower end portion of the movable rod 35 projecting into the switch reception concave portion 80. In the clamped state shown in FIG. 11, the amount of projection of the lower end portion of the movable rod 35 increases and the detection switch 37 goes into the actuated state. According to requirements, the lower end of the switch reception concave portion 80 may be covered over with a lid plate 81 made from metal. In the case of this clamp device 2G, since the detection switch 37 and the lower end portion of the movable rod 35 do not project to the exterior of the lower end surface of the head side end wall member 15G, accordingly they are not disturbed, and it is difficult for them to be damaged.

Next, examples in which the above embodiments are partially changed will be explained.

1) While the clamp device described above had a structure in which driving was performed by hydraulic pressure, it would also be acceptable to provide a structure in which driving is performed by air pressure.

2) It would also be possible to employ some switch other than a limit switch or a proximity switch for the detection switch described above.

3) While the clamp device described above had a structure in which the workpiece was pressed by the end of the output rod, the clamp device could also be a link type clamp device or a clamp device of any of various other types.

4) Instead of the movement restriction mechanism described above, it would also be possible to employ a movement restriction mechanism having a different construction.

5) Apart from the above, it would be possible for a person skilled in the art to implement various changes and/or additions to the present invention without departing from its gist.

The invention claimed is:

1. A hydraulic cylinder comprising a cylinder main body in which a cylinder bore is formed, a piston member including a piston portion that is installed in the cylinder bore so as to be movable therein in its axial direction and an output rod, and at least a single hydraulic pressure operation chamber that is defined within the cylinder bore between the piston portion and a head side end wall of the cylinder main body, and further comprising:
    a rod insertion hole formed in said piston portion and said output rod so as to communicate with said hydraulic pressure operation chamber;
    an auxiliary rod that is provided to said head side end wall so as to project into the cylinder bore, and that can be inserted into said rod insertion hole;
    a rod fitting hole that is formed so as to penetrate through said head side end wall and said auxiliary rod in an axial direction;
    a movable rod that is fitted in said rod fitting hole, and of which an end portion toward said head side end wall projects to an exterior from said rod fitting hole;
    a movement restriction mechanism that, along with prohibiting shifting of said movable rod in said axial direction in a state in which a lower end of said piston portion is positioned in a first region within the cylinder bore and permitting shifting of said movable rod in said axial direction in a state in which the lower end of said piston portion is positioned in a second region within the cylinder bore, also, due to hydraulic pressure in said rod insertion hole, shifts the movable rod by a predetermined distance in the direction in which an amount of projection to the exterior from said rod fitting hole increases; and
    a detection switch that detects whether said movable rod has shifted or not, and that outputs a detection signal.

2. The hydraulic cylinder of claim 1, wherein said movement restriction mechanism comprises:
    a large diameter portion formed at a tip end portion of said movable rod and having a larger diameter than other portion thereof;
    a seal member that is installed on an external circumferential portion of said large diameter portion;
    a large diameter hole portion that is formed in a portion of said rod fitting hole and in which said large diameter portion is movable in the axial direction;
    an annular concave portion that is formed on the large diameter portion of said movable rod;
    a plurality of ball holding openings formed in a cylindrical circumferential wall of the large diameter hole portion of said auxiliary rod;
    a plurality of balls that are held in said plurality of ball holding openings so as each to be movable in a radial direction, and that can partially engage with said annular concave portion; and
    a small diameter hole formed in said rod insertion hole that causes the plurality of balls partially to engage in the annular concave portion when a lower end of the piston portion is in a first region, and a large diameter hole, also formed in said rod insertion hole, that makes it possible for the plurality of balls to escape from the annular concave portion when the lower end of the piston portion is in a second region.

3. The hydraulic cylinder of claim 2, further comprising:
    a small diameter hole forming member that forms said small diameter hole of said piston member;
    a sliding hole that is formed in said piston member and in which said small diameter hole forming member is installed so as to slide freely in the axial direction, and that has a same diameter as said large diameter hole;
    a threaded hole that is formed in said output rod more to the end thereof than said sliding hole;
    a screw shaft, formed integrally with said small diameter hole forming member, and screwed into and engaged with said threaded hole; and
    a tool engagement hole formed at a tip end portion of said screw shaft.

4. The hydraulic cylinder of claim 2, further comprising:
    a spring installation hole formed in the auxiliary rod so as to communicate with said large diameter hole portion; and
    a compression spring that is installed in a portion of said large diameter hole portion and in a spring installation hole, and that biases said movable rod toward the interior of said rod insertion hole.

5. The hydraulic cylinder of claim 1, wherein a fitting hole forming wall portion of said head side end wall that forms a portion of said rod fitting hole and said auxiliary rod are constituted by a unitary auxiliary rod member, and the auxiliary rod member is detachably fixed to said cylinder main body in order to be possible to exchange of the auxiliary rod member for an auxiliary rod member having a different length.

6. The hydraulic cylinder of claim 5, further comprising:
    a male screw portion formed on an external circumferential portion of said auxiliary rod member;
    a threaded hole formed in said head side end wall, and into which said auxiliary rod member is screwed;
    a lock nut that is screwed over and engaged with the auxiliary rod member at an exterior side of said head side end wall; and
    a seal washer that is fitted over the auxiliary rod member between said head side end wall and said lock nut.

7. The hydraulic cylinder of claim 1, wherein, when the lower end of said piston portion is in the second region, said piston portion contacts against or approaches a rod side end wall.

8. The hydraulic cylinder of claim 1, wherein, when the lower end of said piston portion is in the second region, said piston portion is positioned at an intermediate portion of the cylinder bore in its length direction.

9. A hydraulic pressure driven type clamp device, further comprising a hydraulic cylinder according to claim 1.

10. A hydraulic pressure driven type clamp device comprising a cylinder main body in which a cylinder bore is formed, a piston member including a piston portion that is installed in the cylinder bore so as to be movable therein in its axial direction and an output rod, and at least a single hydraulic pressure operation chamber that is defined within the cylinder bore between the piston portion and a head side end wall of the cylinder main body, and further comprising:

a rod insertion hole formed in said piston portion and said output rod so as to communicate with said hydraulic pressure operation chamber;

an auxiliary rod that is provided to said head side end wall so as to project into the cylinder bore, and that can be inserted into said rod insertion hole;

a rod fitting hole that is formed so as to penetrate through said head side end wall and said auxiliary rod in an axial direction;

a movable rod that is fitted in said rod fitting hole, and of which an end portion toward said head side end wall projects to the exterior from said rod fitting hole;

a movement restriction mechanism that, along with prohibiting shifting of said movable rod in said axial direction in a state in which said piston member is in an unclamp position and permitting shifting of said movable rod in said axial direction in a state in which said piston portion is in a clamp position, also, due to hydraulic pressure in said rod insertion hole, shifts the movable rod by a predetermined distance in the direction in which an amount of projection to the exterior from said rod fitting hole increases; and a detection switch that detects whether said movable rod has shifted or not, and that outputs a detection signal.

* * * * *